United States Patent Office 3,041,325
Patented June 26, 1962

3,041,325
POLYMERIZATION OF OLEFIN AND CATALYST SYSTEM THEREFOR
Alford G. Farnham, Mendham, N.J., assignor to Union Carbide Corporation, a corporation of New York
No Drawing. Filed May 5, 1958, Ser. No. 732,792
15 Claims. (Cl. 260—93.5)

This invention relates to the polymerization of alpha-olefins, and more particularly to a novel catalyst system useful for an extremely rapid polymerization of alpha-olefins.

Crystalline polymers of olefinically unsaturated hydrocarbons containing asymmetrical groups have been reported by Natta (J. Amer. Chem. Soc., 77, 1709; J. Polym. Sci. XVI, 143) who has termed them "isotactic" materials because of their regularly ordered configuration in which the arrangement around successive asymmetric carbon atoms is the same for great distances along the polymer molecules.

These isotactic or crystalline polymers have a greater density, higher melting and softening temperatures and lower solubility in organic solvents than an amorphous polymer of the same average molecular weight. For example, crystalline polystyrene is insoluble in diethyl ether and methyl ethyl ketone while amorphous polystyrene is soluble in both; crystalline polypropylene is insoluble in boiling diethyl ether and cold heptane, while amorphous polypropylene is soluble in both. X-ray diffraction patterns and infra-red absorptions also differ, e.g. crystalline polystyrene shows infra-red absorption bands at 7.9, 9.25, 9.5 and 10.9 millimicrons; amorphous polystyrene shows none of these absorption bands. The intrinsic viscosity measurements, however, for the amorphous and crystalline polymers can be the same order of magnitude.

The differences in properties between the two types of polymers are traceable to the differing structural features they possess. Assuming a head-to-tail linkage between successive units,

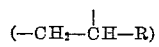

of the linear polymer and no branch chains other than R, structure variations in the polymer can occur by changes in the spatial position of R on the asymmetric carbon atom, i.e., R can be above or below that plane of the molecule perpendicular to the R group axis. Where a disordered distribution of R groups occurs, the polymer is amorphous, but where the R groups exhibit a regularity of configuration, i.e., where all R groups are located on one side of that plane which contains the axis of the molecule and is perpendicular to the axis of the R groups, then the polymer is crystalline.

This application is a continuation in part of my co-pending application Serial No. 577,190, filed April 10, 1956, and now abandoned.

Good yields of crystalline isotactic polymer are obtained in the method of Serial No. 677,190 using a catalytically active complex of a solid transition metal trihalide and an organo-aluminum compound in an inert liquid hydrocarbon, but the best rate of polymerization observed in that method was less than two grams of polymer per gram of catalyst per hour.

I have now found that a thirty-fold or greater increase in the rate of polymerization can be achieved by employing in the catalytically activated complex a transition metal trihalide component with an average particle size of 2.0 to 0.01 microns. More particularly, a catalyst comprising a dispersion in an inert liquid hydrocarbon carrier of one mol of a trichloride or tribromide of vanadium or titanium ground to an average particle size of 2.0 to 0.01 microns or smaller and 0.5 to 2.5 mols of an organo-aluminum compound such as triisobutyl aluminum can effect a more rapid polymerization of alpha-olefins having 3 or more carbon atoms than has heretofore been achieved.

Equally important with the increase in the rate of polymerization, the percentage of crystallinity of the polymer product obtained is surprisingly not reduced. Thus, the catalytically active dispersion of a transition metal trihalide mixed with an organo-aluminum compound provides the advantage of vastly increased rates of polymerization and does not reduce the amount of desired product, the isotactic polymer, obtained.

The transition metal trihalide particles useful in this invention are conveniently prepared by grinding in an oscillatory vibrating mill or the like under an inert atmosphere such as nitrogen or argon. Ordinarily available titanium and vanadium trichlorides and tribromides have an average particle size, or average diameter, of from 100 to 300 microns or larger. These particles can be reduced to an average particle size of 2.0 to 0.1 microns by grinding for 8 to 24 hours in an oscillatory vibrating mill, such as that sold by Siebtechnik A.G., Mulheim, Germany, or in any device providing an equivalent grinding action. The Siebtechnik mill imparts a rapid rotary motion to a chamber filled with ½" steel balls. Grinding for up to 48 hours in this mill provides particles averaging 0.1 to 0.01 in diameter which are preferred in the present invention. Continued grinding, up to 72 hours, does not reduce the average particle size significantly, however. The smaller sized particles obtained by grinding for 48 hours provide the most rapid rate of polymerization and do not decrease the percentage of crystalline isotactic polymer in the product. By fractionating the finely ground titanium or vanadium trihalide and using only the smaller particles i.e. those near 0.01 micron in diameter, even more rapid polymerization can be obtained.

For convenience in handling and in order to prepare the catalyst for immediate use in polymerizing the alpha-olefins, the ground trihalide particles are suspended in an inert liquid hydrocarbon during the grinding process. Liquids suitable for this purpose are aliphatic compounds such as kerosene, heptane, and cyclohexane; and aromatic compounds such as benzene, isopropyl benzene, xylene, and toluene.

The organo-aluminum compound component of the catalyst can be added to the finely ground titanium or vanadium halide as a solution in an inert liquid hydrocarbon.

Organo-aluminum compounds suitable for use in the present invention have the generic formula

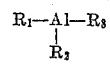

wherein $R_1$ is a hydrogen atom, an alkyl group or an aryl group; $R_2$ is an alkyl or aryl group; and $R_3$ is an alkyl or an aryl group. I particularly prefer among the trialkyl-aluminum compounds and their hydrides, diisobutyl aluminum hydride, triisobutyl aluminum and triethyl aluminum; and among the triaryl-aluminum compounds, triphenyl aluminum. For best catalytic results, the mixture is made in the ratio of 0.5 to 2.5 mols, preferably one mol of organo-aluminum compound to each mol of titanium or vanadium trichloride. Higher ratios, while catalytically operable, do not confer any additional advantages in rate, amount of yield or percentage of crystallinity in the product.

The catalytically active complex of my invention can be used to effect the extremely rapid polymerization of alpha-olefins having more than 3 carbon atoms, such as styrene, propylene, 1-butene, 4-phenyl butene and the like, to highly crystalline isotactic polymers. Generally from 25 to about 2000 mols of monomer are polymerizable with each mol of finely ground catalyst. Monomer and catalyst are mixed and heated with stirring at a temperature dependent upon the solvent used and the monomer undergoing polymerization. When the reaction is complete as shown by the polymer being too thick to stir, the crude product is washed free of most catalyst residues with additional solvent, and then with a 1 to 5% aqueous acid solution to neutralize any residues which may remain.

For example, to effect the rapid polymerization of styrene to highly crystalline isotactic polystyrene, one mol of the catalytically active complex hereinbefore described is provided as a 10% solution in a saturated hydrocarbon such as toluene or the like, with about 100 moles of the styrene monomer to be polymerized. The catalyst solution is heated to 50°–60° C. with stirring, and the styrene added slowly with continued stirring. When the resulting gelatinous mass of polymer becomes too viscous for further stirring, it is washed with water or dilute acid to remove excess catalyst; then a nonsolvent for the polymer, i.e. methanol, ethanol, or isopropanol, is added to precipitate the polymer from the toluene or other catalyst carried. A more complete removal of catalyst residues is achieved by heating the polymer with additional toluene to about 70–90° C. prior to washing. The precipitate is filtered and dried, preferably under vacuum, at about 50° C. to 60° C.

The catalytic method and catalyst composition of this invention generally provide a polymer product of which 75% or more is crystalline and isotactic. The remainder or amorphous portion of the polymer product is "amorphous" and non-crystalline and exhibits little regularity of configuration. Where it is desired to remove the amorphous polymer, the dried polystyrene can be extracted by heating the polymer product with diethyl ether.

The above-described polymerization of styrene can be carried out at temperatures of from about 20° to about 110° C. depending on the boiling point of the catalyst carrier used. With toluene as a carrier, temperatures ranging between about 80° and 100° C. are preferred.

The rapid polymerization of propylene to highly crystalline polypropylene is similarly carried out. One mol of the catalytically active complex of my invention as a 10% suspension in toluene and 100 mols of propylene to be polymerized is heated with stirring to 40–70° C. and propylene is bubbled through at atmospheric pressure. Elevated temperatures, up to 150° C. and pressures up to 400–500 p.s.i. can be employed but polymerization is quite rapid at atmospheric pressure and moderate temperatures of 40–70° C. The polypropylene is isolated in the same manner as just described for polystyrene.

In the following examples and experiments the rate of reaction was determined from the equation:

Rate=g. polymer/g. catalyst/hour

The Examples 1–5 are illustrative of the novel method and catalyst composition of my invention. Following these examples, for the sake of comparison, are experiments showing the unimproved rates of similar reactions which do not use a finely divided catalyst.

The results of the Examples 1–5 are summarized in the table following the examples.

EXAMPLE 1

One hundred ml. of purified toluene were mixed with 100 ml. of styrene which had been purified by being passed over activated alumina. Four millimoles of triisobutyl aluminum, as a 20% solution in toluene, and 4 millimoles of titanium trichloride, which had been ground for 8 hours in the Siebtechnik mill, described above, to an average particle size of less than 2 microns, were then added as a 10% to 20% solution in toluene. This mixture was heated to 60° C. for 10 minutes and reacted under a nitrogen blanket at 75° C.±2° for one hour while being agitated. The resulting polymerization reaction was halted by the addition of 100 ml. of isopropanol containing 0.1% of 2,6-ditertiary butyl paracresol as a polymerization inhibitor. The precipitated polymer was filtered off, washed with alcohol and then dried under vacuum for a period of 8 hours. The yield was 39.6 grams of polymer; 90.6% of the polymer was insoluble on extraction with boiling methyl ethyl ketone. The reaction rate was 28.1.

EXAMPLE 2

The procedure of Example 1 was carried out using titanium trichloride which had been ground for 24 hours under nitrogen to an average particle size of less than 1 micron. The yield was 70.1 grams of polymer, 91.4% of which was crystalline polystyrene. The reaction rate was 49.7.

EXAMPLE 3

The procedure of Example 1 was carried out using titanium trichloride which had been ground in the above-described manner for 48 hours to an average particle size of less than 0.1 micron. The yield was 79.3 grams of polymer; 92.4% was crystalline polystyrene. The reaction rate was 56.3.

EXAMPLE 4

Into a dry flask equipped with a stirrer, gas inlet tube, thermometer and a condenser with a provision for positive protection by an inert gas atmosphere, were placed: 1500 ml. of dry toluene; 10 millimoles of a solution of triisobutyl aluminum; and 10 millimoles of titanium trichloride prepared by grinding forty grams of TiCl$_3$ with 180 ml. of dry benzene in the Siebtechnik mill under nitrogen for 8 hours. The sizes of the trichloride particles were found by means of electron microscope measurement to be in the range of 0.1 and two microns.

The mixture was agitated at 40° C. and the propylene feed was begun. Within 15 minutes the temperature was at 70°–75° C. Propylene feed was continued at a rate slightly in excess of its rate of absorption for a period of three hours while the temperature of the flask was maintained at about 75° C. 1000 ml. of isopropanol were added and the slurry was removed from the flask. An additional 1000 ml. of isopropanol and 500 ml. of methanol were used to precipitate the polymer. After being cooled to 30° C. the mixture was filtered. The particulate polymer was reslurried, washed with additional isopropanol, and dried to constant weight. The total yield was 144 grams. The amount of crystalline polypropylene as determined by overnight extraction with boiling ethyl ether was 108 grams or 75.3%. The rate of reaction was 13.7.

EXAMPLE 5

The procedure of Example 4 was repeated except that triethyl aluminum was used in place of triisobutyl aluminum. The yield, after 2.5 hours of polymerization, was 170 g.; 89.1% was crystalline polypropylene. The reaction rate was 25.4.

Films made from these polypropylenes are transparent and exceptionally impermeable to a wide variety of vapors and gases.

The results of the preceding examples are tabulated in the table following. Both polypropylene and polystyrene of high crystallinity were produced at a good rate. Comparing Examples 1, 2 and 3 it will be noted that a decrease in average particle size produces greatly increased rates and, not a decrease, but surprisingly an increase in the percent crystallinity of the polystyrene obtained.

| Example | Average particle Size [1] | Rate of Reaction [2] | Product | Crystallinity (Percent) |
|---|---|---|---|---|
| 1 | <2 | 28.1 | Polystyrene | 90.6 |
| 2 | <1 | 49.7 | do | 91.4 |
| 3 | <0.1 | 56.3 | do | 92.4 |
| 4 | <2 | 13.7 | Polypropylene | 75.4 |
| 5 | <2 | 25.4 | do | 89.1 |

[1] Average particle sizes were determined by measurement of enlarged electron microscope pictures of the particles.
[2] Gram polymer/gram catalyst/hour For the purpose of comparison, a series of experiments were run using a coarsely ground metal trihalide. Even a slight increase in average particle size, cf. Experiment III, severely retarded the rate of reaction.

*Experiment I*

A 5% by weight suspension of titanium trichloride with a particle size of about 10 to 20 microns was prepared by ball milling in a bacteria brinder with dry cyclohexane. A 10% by volume solution of triisobutyl aluminum in dry cyclohexane was also prepared.

To about 1200 ml. of dry benzene was added: 120.4 ml. of the 5% suspension of TiCl₃, 98.4 ml. of the 10% triisobutyl aluminum solution and 298 ml. (270.4 grams) of dry styrene monomer. The mixture was heated to 50°–60° and stirred for about 20 hours, after which the stirrer stopped because of the high viscosity of the mixture. After standing for an additional 20 hours, the mixture was vigorously agitated with several changes of water, which were decanted off. Methanol was added to the gelatinous benzene-polymer mixture to precipitate the polymer as a granular white powder. This was filtered off, washed with methanol, and dried in an oven at 100°–110° C. The yield of polymer was 221.72 grams (82% yield) of which 96.5% was insoluble on extraction with boiling diethyl ether. The melting point was about 230° C. The rate of reaction was 0.7.

*Experiment II*

Vanadium trichloride was prepared by heating 22.2 g. of vanadium tetrachloride under reflux in a stream of dry carbon dioxide for 50 hours at 160–170° C. Any unchanged vanadium tetrachloride was removed by vacuum distillation. The yield of purple solid vanadium trichloride was 12.7 g. This was ground under benzene in a bacteria grinder to a particle size of about 10 microns.

Ten millimoles of the above vanadium trichloride was mixed with 10 millimoles triisobutyl aluminum in about 500 ml. benzene and 100 ml. styrene was added. The mixture was heated with stirring in a flask 21 hours at 50–60° C. Particle formation within 1 hour, and noticeably increased viscosity within three hours, was evidence of polymerization. After 18 hours, the product was gelatinous semi-solid mass. Toluene (100 ml.) and 2% hydrochloric acid (250 ml.) were added causing the mixture to turn from purple to brown. The polymer was washed with hot water in a blender and gradually turned from brown to white. It was precipitated with methanol and filtered off. Yield of polystyrene was 43.6 g. (48.5% yield); ash content, 0.9%. On extraction with boiling ether, the percent insoluble was 81. The rate of reaction was about 0.7. A disc molded at 160 to 170° C. and at 1000 p.s.i. was translucent and light gray in color.

*Experiment III*

The procedure of Example 4 was repeated except that TiCl₃ with an average particle size of about 5 microns was used. The yield, after polymerizing for 3½ hours, was only 6 g.; 75.1% was crystalline polypropylene. The reaction rate was 0.5.

*Experiment IV*

The procedure of Example 5 was repeated except that TiCl₃ with a particle size of about 5 microns was used. The yield of polymer, after polymerizing for 8¼ hours, was only 44 g.; 89.6% was crystalline polypropylene. The reaction rate was less than 2.

The ultra-fine dispersion of the catalyst, in addition to providing greatly increased rates of polymerization, is advantageous in that the more finely dispersed catalyst is more easily removed from the polymer and there is less ash content in the product due to the use of less catalyst.

The highly crystalline polymers obtained with the method of this invention because of their greater densities and lower solubilities have improved utility for numerous applications particularly filaments, fibers, sheets and films. They can be molded, extruded, cast from solution or calendared in conventional fashion. The materials have an essentially non-polar structure, so they exhibit excellent electrical properties even at high frequencies. Since they have practically no water absorption, the electrical properties remain virtually uneffected by humidity. Such excellent electrical properties combined with good thermal and mechanical characteristics result in superior insulation.

Their heat resistance and mechanical properties, together with unusual chemical resistance, make these isotactic polymers a good choice for pipe applications. They are resistant to acidic, alkaline, and saline solutions even at elevated temperatures. At room temperatures they resist organic solvents and polar substances without embrittlement. Absorption of mineral and vegetable oils is extremely low.

What is claimed is:

1. In the method of polymerizing alpha-olefins having at least 3 carbon atoms to isotactic polymers by contacting under polymerizing conditions the alpha-olefin monomer with catalytic quantities of a mixture comprising an organo-aluminum compound having the formula

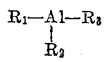

wherein $R_1$ is a member selected from the class consisting of hydrogen, alkyl, and aryl groups and $R_2$ and $R_3$ are members selected from the class consisting of alkyl and aryl groups and a transition metal trihalide selected from the group consisting of titanium trichloride, titanium tribromide, vanadium trichloride and vanadium tribromide, the improvement which comprises employing the transition metal trihalide in an average particle size of less than 2 microns.

2. In the method of polymerizing alpha-olefins having at least 3 carbon atoms to isotactic polymers by contacting under polymerizing conditions the alpha-olefin monomer with catalytic quantities of a mixture comprising 0.5 to 2.5 mols of an organo-aluminum compound having the formula

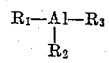

wherein $R_1$ is a member selected from the class consisting of hydrogen, alkyl, and aryl groups and $R_2$ and $R_3$ are members selected from the class consisting of alkyl and aryl groups per mol of a transition metal trihalide selected from the group consisting of titanium trichloride, titanium tribromide, vanadium trichloride and vanadium tribromide, the improvement which comprises employing the transition metal halide in an average particle size of less than 2 microns.

3. In the method of polymerizing alpha-olefins having at least 3 carbon atoms to isotactic polymers by contacting under polymerizing conditions the alpha-olefin monomer with catalytic quantities of a mixture comprising 0.5 to 2.5 moles of a trialkyl aluminum compound per mol of a transition metal trihalide selected from the group consisting of titanium trichloride, titanium tribromide, vanadium trichloride and vanadium tribromide, the improvement which comprises employing the transition metal halide in an average particle size of less than 2 microns.

4. In the method of polymerizing alpha-olefins having at least 3 carbon atoms to isotactic polymers by contacting under polymerizing conditions the alpha-olefin monomer with catalytic quantities of a mixture comprising 0.5 to 2.5 mols of a triaryl aluminum compound per mol of a transition metal trihalide selected from the group consisting of titanium trichloride, titanium tribromide, vanadium trichloride and vanadium tribromide, the improvement which comprises employing the transition metal halide in an average particle size less than 2 microns.

5. In the method of polymerizing alpha-olefins having at least 3 carbon atoms to isotactic polymers by contacting under polymerizing conditions the alpha-olefin monomer with a catalytic quantity of a mixture comprising equimolar amounts of triisobutyl aluminum and titanium trichloride, the improvement which comprises employing particles of titanium trichloride having an average particle size less than about 0.1 micron.

6. A catalytically active composition useful for rapidly polymerizing alpha-olefins having at least 3 carbon atoms comprising a dispersion of a transition metal trihalide selected from the group consisting of titanium trichloride, titanium tribromide, vanadium trichloride and vanadium tribromide having an average particle size of less than 2 microns, in a dry inert liquid hydrocarbon, and intermixed therewith an organo-aluminum compound having the formula

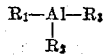

wherein $R_1$ is a member selected from the class consisting of hydrogen, alkyl, and aryl groups and $R_2$ and $R_3$ are members selected from the class consisting of alkyl and aryl groups.

7. A catalytically active composition useful for rapidly polymerizing alpha-olefins having at least 3 carbon atoms comprising a dispersion of a transition metal trihalide selected from the group consisting of titanium trichloride, titanium tribromide, vanadium trichloride and vanadium tribromide having an average particle size of less than 2 microns, in a dry inert liquid hydrocarbon, and intermixed therewith an organo-aluminum compound having the formula

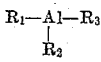

wherein $R_1$ is a member selected from the class consisting of hydrogen, alkyl, and aryl groups and $R_2$ and $R_3$ are members selected from the class consisting of alkyl and aryl groups, the ratio of the catalyst components being from 0.5 to 2.5 moles of organo-aluminum compound per mole of transition metal trihalide.

8. A catalytically active composition useful for rapidly polymerizing alpha-olefins having at least 3 carbon atoms comprising a dispersion of a member selected from the group consisting of titanium trichloride, vanadium trichloride, titanium tribromide and vanadium tribromide having an average particle size of less than 0.1 micron in a dry inert liquid hydrocarbon, and intermixed therewith a trialkyl aluminum compound and triaryl aluminum compounds, the ratio of the components being substantially equimolar.

9. A catalytically active composition useful for rapidly polymerizing alpha-olefins having at least 3 carbon atoms comprising a dispersion of titanium trichloride having an average particle size of less than 0.1 micron in toluene and intermixed therewith in a substantially equimolar ratio an organo aluminum compound having the formula

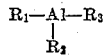

wherein $R_1$ is a member selected from the class consisting of hydrogen, alkyl, and aryl groups and $R_2$ and $R_3$ are members selected from the class consisting of alkyl and aryl groups.

10. A method for rapidly polymerizing alpha-olefins having at least three carbon atoms to highly crystalline isotactic polymers which includes the steps of forming a dispersion of a transition metal trihalide having an average particle size of less than 2 microns in a dry inert liquid hydrocarbon, adding thereto an organo-aluminum compound having the formula

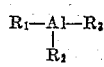

wherein $R_1$ is a member selected from the class consisting of hydrogen, alkyl, and aryl groups and $R_2$ and $R_3$ are members selected from the class consisting of alkyl and aryl groups in a ratio of 0.5 to 2.5 mols of organo-aluminum compound per 1 mol of transition metal trihalide selected from the group consisting of titanium trichloride, titanium tribromide, vanadium trichloride and vanadium tribromide, adding from 25 to 1000 mols of monomer per 1 mol of catalyst, heating the mixture until it becomes highly viscous, and thereafter separating the polymer obtained from the catalyst residues.

11. A method for rapidly polymerizing alpha-olefins having at least three carbon atoms to highly crystalline isotactic polymers which includes the steps of forming a dispersion of titanium trichloride having an average particle size of less than 2 microns in a dry inert liquid hydrocarbon, adding thereto an organo-aluminum compound selected from the group consisting of trialkyl aluminum compounds and triaryl aluminum compounds in an equimolar ratio, adding from 25 to 2000 mols of monomer per 1 mol of catalyst, heating the mixture to a temperature of about 40–70° C. until it becomes highly viscous, and thereafter separating the polymer obtained from the catalyst residues.

12. Method claimed in claim 1, wherein the alpha-olefin is styrene.

13. Method claimed in claim 1, wherein the alpha-olefin is propylene.

14. Method claimed in claim 10, wherein the alpha-olefin is styrene.

15. Method claimed in claim 10, wherein the alpha-olefin is propylene.

References Cited in the file of this patent
UNITED STATES PATENTS

| | | |
|---|---|---|
| 2,880,199 | Jezl | Mar. 31, 1959 |
| 2,882,263 | Natta et al. | Apr. 14, 1959 |
| 2,891,041 | Matlack | June 16, 1959 |

FOREIGN PATENTS

| | | |
|---|---|---|
| 538,782 | Belgium | Dec. 6, 1955 |
| 526,101 | Italy | May 14, 1955 |

OTHER REFERENCES

Griffith et al.: Contact Catalysis, page 169, Oxford University Press (1957), London.

UNITED STATES PATENT OFFICE
CERTIFICATE OF CORRECTION

Patent No. 3,041,325                      June 26, 1962

Alford G. Farnham

It is hereby certified that error appears in the above numbered patent requiring correction and that the said Letters Patent should read as corrected below.

Column 1, line 57, for "677,190" read -- 577,190 --; column 3, line 31, for "carried" read -- carrier --; column 7, lines 64 and 65, strike out "and triaryl aluminum compounds"; column 8, lines 37 and 38, strike out "an organo-aluminum compound selected from the group consisting of" and insert instead -- a --; same column 8, line 39, for "compounds" read -- compound --; same line 39, strike out "and triaryl aluminum compounds".

Signed and sealed this 4th day of December 1962.

(SEAL)
Attest:

ERNEST W. SWIDER
Attesting Officer

DAVID L. LADD
Commissioner of Patents